Patented Feb. 19, 1929.

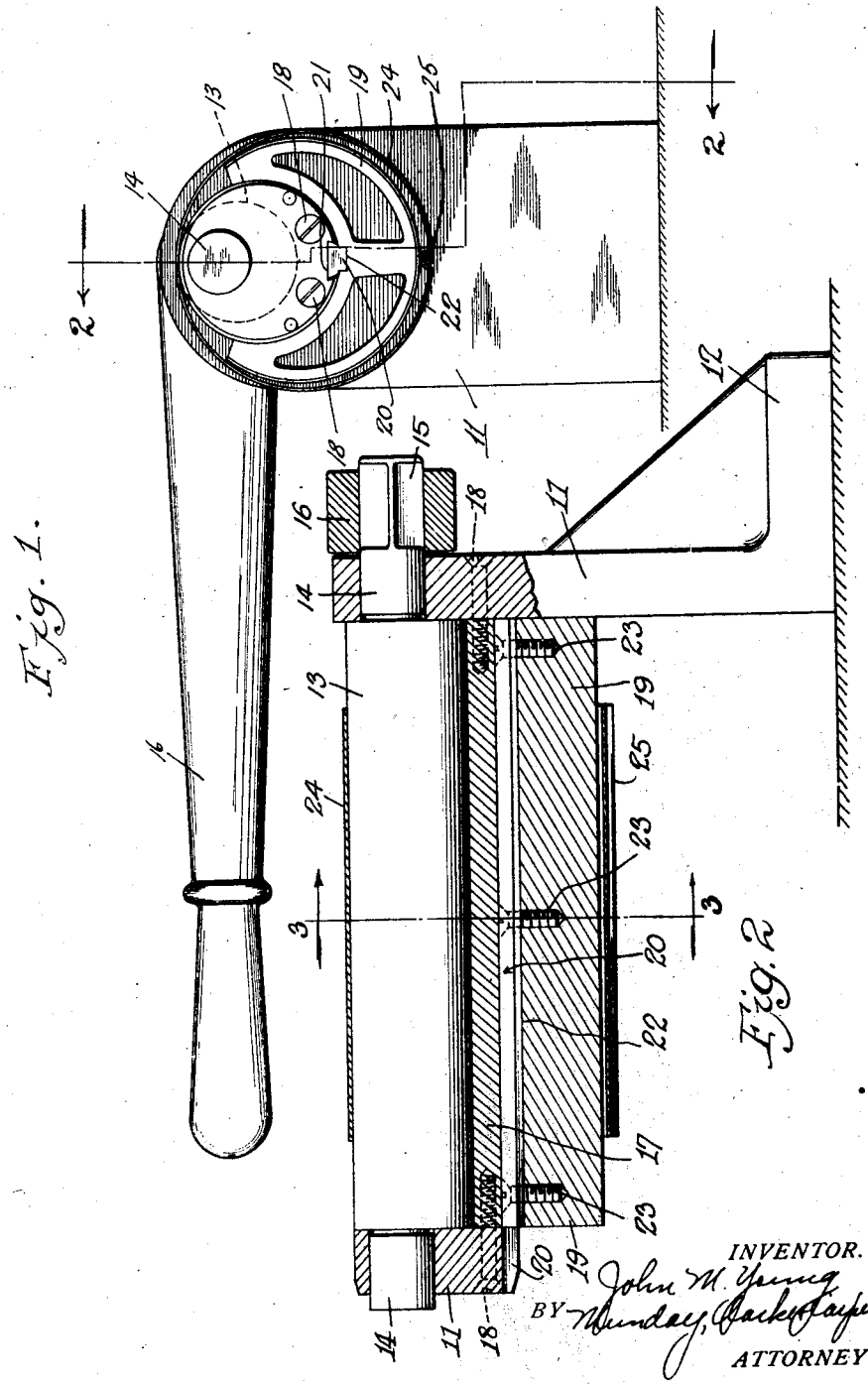

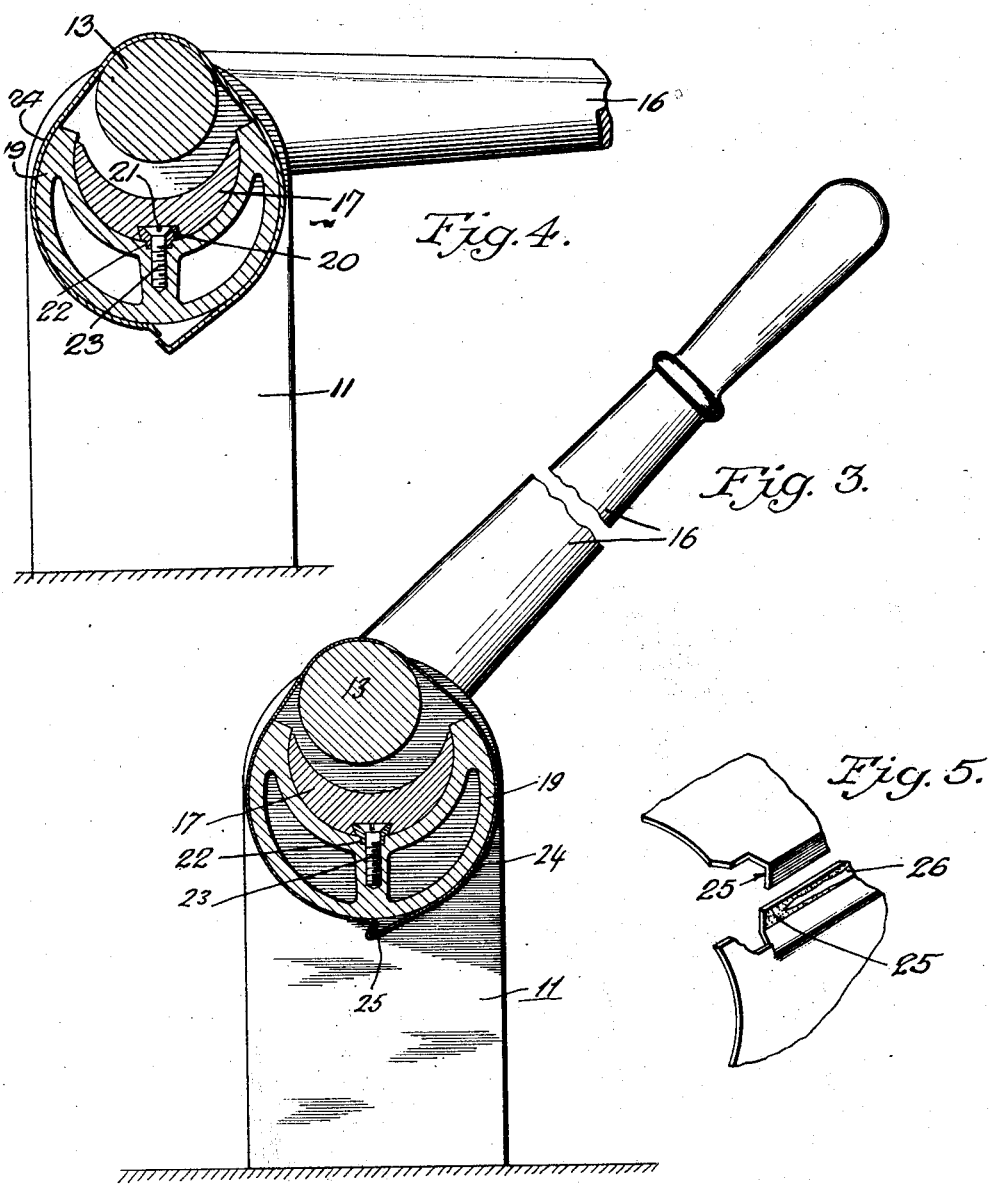

1,702,584

UNITED STATES PATENT OFFICE.

JOHN M. YOUNG, OF BROOKLYN, NEW YORK, ASSIGNOR TO AMERICAN CAN COMPANY, OF NEW YORK, N. Y., A CORPORATION OF NEW JERSEY.

MACHINE EMPLOYED IN CONNECTION WITH THE MANUFACTURE OF METAL CONTAINERS.

Application filed February 20, 1926. Serial No. 89,586.

This invention relates in general to a machine employed in connection with the manufacture of metal containers.

It is well known in the art of can making that owing to slight defects and wear and tear of machine parts, which cannot always be discovered immediately, not all cans are turned out perfect. Sometimes cans are defective because of imperfectly formed hooked or locked seams, sometimes because of faulty laps and sometimes because of imperfect application of solder to the lock and lap side seam. At the present time when it is desired to inspect the condition of side seams of cans or other containers, the container is positioned upon a fixed circular horn and a pair of pliers are used to cut away a part of the side seam from the body, and then the side seam is torn open by means of the pliers to expose the seam. This procedure is not only slow, and cumbersome, but it also involves the possible destruction of a portion of the container wall by cutting or wrinkling or so badly creasing the container wall that it cannot be used as a blank for cutting out can ends. One of the objects of my present invention, therefore, resides in providing a device for quickly and easily inspecting the condition and strength of the soldered parts of the side seam and for testing the sufficiency of solder penetration into the side seam.

Another important object of my invention resides in providing means for quickly and easily rupturing the side seam of cylindrical containers, and without cutting, wrinkling or otherwise damaging the can wall so that the ruptured side seam may be inspected for defects.

Another important object of the invention is the provision of a compact, efficient, hand operated, tool, device or machine for positively forcing or bursting open the soldered lock and lap side seams of metal containers for the purpose of inspecting and testing them for any possible defects.

Another important object of the invention is the provision of a side seam opening device which may be adjusted to accommodate container bodies of varying size and diameter.

Numerous other objects and advantages of the invention will be apparent as it is better understood from the following description, which, taken in connection with the accompanying drawings, discloses a preferred embodiment thereof.

Referring now to the drawings which form a part of this specification:

Fig. 1 is a front elevational view of the apparatus showing a can body positioned upon the mandrel ready to be operated upon, and also showing the hand lever in substantially horizontal or inoperative position.

Fig. 2 is a longitudinal cross section taken through lines 2—2 of Fig. 1 showing the eccentrically mounted expanding horn within the holding mandrel.

Fig. 3 is a cross sectional view taken on the lines 3—3 of Fig. 2 and showing the expanding horn and hand lever in partially raised or initially operative position and also showing the side seam started on its course of disruption.

Fig. 4 is a cross sectional view similar to Fig. 3 showing the eccentric expanding horn in extreme raised position, and also showing the side seam of the can body completely disrupted.

Fig. 5 is a fragmental perspective view showing the hooked edges of the can body separated and illustrating a part of the side seam hook, devoid of solder.

In its fundamental features, my invention comprises two co-operative members, adapted to receive thereon, or thereover, the seamed article, the seam of which is desired to be ruptured. And means is provided for shifting these members relatively, so as to increase their distance apart when the seamed wall is pressed thereover, whereby the members pressing against the wall force, or burst, the side seam. In bursting the side seams of containers of any particular shape, or cross section, these co-operative members are preferably formed so as to receive snugly the container, so that when the co-operative members are shifted relatively, the side seam of the member will be burst without wrinkling, creasing, or otherwise damaging the container wall. The present embodiment of my invention is disclosed by reference to an apparatus for bursting the side seam of cylindrical cans or containers. Referring more in detail to the drawings, where like reference numerals indicate like parts, the operative parts of my apparatus are supported by a frame 11, having transverse foot extensions 12. An expanding horn 13 is eccentrically mounted on stub shafts 14, having bearings in the opposite upper frame parts 11, 11'. The stub shaft 14 at the right hand end of Fig. 2 has a square extension 15, upon which is keyed a hand lever arm 16, which may be swung around a circular path of about 180 degrees from its in-operative position shown in Fig. 1, to its extreme expanding position, shown in Fig. 4. A semi-circular concave inner, solid mandrel 17 is permanently and rigidly secured to the frame 11, 11' by means of screws 18. The inner mandrel and screws 18 support the outer bearing or frame part 11'. Tightly, but removably hugging said inner, solid mandrel 17, is an outer hollow mandrel 19 of circular formation, to conform to the shape and size of the can body, the side seam of which is to be disrupted. Said outer mandrel is removably secured to said inner mandrel by means of a longitudinal spline or feather-member 20, which is tapered and has its widest part closely fitting within a correspondingly shaped longitudinal groove 21 in the lower central part of the inner solid mandrel 17, said spline or key-member 20 has its narrow lower end fitting within a corresponding rectangular groove 22 in the upper central part of the outer hollow mandrel 19, and is permanently secured to said outer mandrel by a series of screws 23.

When the side seam opening apparatus is in inoperative position, as illustrated in Fig. 1, a can body 24 with its side seam 25 is slipped over the expanding horn 13 and the outer hollow mandrel 19 from the left-hand side of the apparatus, as illustrated in Fig. 2. The can body 24 is preferably so positioned over the horn and mandrel that the side seam 25 is located in the lower central part of the outside hollow mandrel, but it will be obvious that the side seam might be caused to assume a diagonally opposite position, or any position between these two extremes. When the can body 24 is thus positioned as shown in Fig. 1 the hand lever 16 is raised to position shown in Fig. 3 with the result that the cylindrical part of the eccentrically mounted horn 13 which is removed the greatest distance from the central axis of the shaft 14, is pressed against the inside of the can body and forces the same out of true cylindrical shape and also starts the disruption of the side seam, that is to say, the solder around the side seam is forcibly broken and the hooked edges of the can body are forced apart, as shown in Fig. 3. A further turn of the hand lever 16 moves the horn 13 still further away from the concavity of the solid inner mandrel 17 and stretches the can body to such an extent that the side seam hooks are completely torn asunder or disrupted, as shown in Fig. 4, and also in Fig. 5. The latter figure illustrates a disrupted side seam which was improperly soldered in that the solder had not completely penetrated and covered the whole area desired to be soldered, reference numeral 26 indicating a portion of the area devoid of solder and therefore representing a defectively soldered side seam. It is for the purpose of detecting such solder defects that the present apparatus finds a most valuable employment. If such defects are detected in time that part of the soldering mechanism which is responsible for the defect can be remedied, and thus a great many defective cans will be prevented from reaching the packer unnoticed.

As already alluded to, the hollow outside mandrel 19 is removably secured to the inside solid mandrel 17 by means of the spline 20. When cans of smaller or larger diameter are to be tested on this apparatus the hollow mandrel 19 with its wedge shaped spline 20 is longitudinally pulled out of contact with the inner, solid and stationary mandrel 17, with a sliding motion, and another hollow mandrel of smaller or larger cylindrical conformation is substituted to correspond with the smaller or larger diameter of the can body as the case may be. It will be thus apparent that this substitution of only a small part of the whole apparatus for testing cans of different diameter is of great advantage and constitutes an important feature of my invention.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a device of the character described the combination of a standard, a mandrel and a horn mounted thereon, and having surfaces adapted to have a cylindrical container inserted thereon, and means for shifting the horn relative to the mandrel to increase the diametral dimension of the container so as to rupture the seam thereof.

2. In a device of the character described, the combination of a support, a mandrel and a horn mounted thereon and having arcuate surfaces adapted to have a cylindrical containers slipped thereover, and means for moving one of said arcuate surfaces eccentrically relative to the other to increase the diametral dimension of the container to rupture the side seam thereof.

3. In a device of the character described, the combination of a support, a mandrel and a horn mounted thereon and adapted to have a container slipped thereover, means for shifting the mandrel and horn relatively to increase the diametral dimension of the container to rupture the side seam thereof, and means for detachably connecting the mandrel to the horn whereby mandrels of various sizes may be interchangeably connected to accommodate containers of various sizes.

4. In a device of the character described, in combination with a support, a mandrel rigidly mounted thereon, a supplemental mandrel rigidly and detachably connected thereto and provided with an arcuate surface to conform to the inner wall of a container adapted to be slipped thereover, a horn eccentrically mounted on said support adjacent said first mandrel, and in one position adapted to lie within the normal circumferential walls of the container, and means for eccentrically moving said horn to cause it to expand the circumferential wall of the container to rupture the side seam thereof.

5. In a device of the character described, the combination of a support, stub shafts mounted thereon, a horn eccentrically mounted on said stub shafts, means for angularly moving said stub shafts to eccentrically shift said horn, a substantially crescent shaped mandrel rigidly mounted on said support adjacent the periphery of said horn in one position thereover, a substantially crescent shaped interchangeable mandrel detachably connected to the convex surface of said first mentioned mandrel whereby said mandrels and horn are adapted to receive a cylindrical container thereover, so that when said stub shafts are angularly shifted said horn will move eccentrically to the mandrels and will burst the side seam of the container.

6. In a device of the character described, in combination with a support, a mandrel rigidly mounted thereon, a horn mounted on said support relatively close to said mandrel, means for shifting said horn away from said mandrel, an interchangeable mandrel adjacent said first mentioned mandrel, and a spline connection between said mandrels for permitting the removal of said second mandrel from said first mentioned mandrel.

7. In a device of the character described, in combination with a support, a substantially crescent shaped mandrel mounted thereon, a substantially circular horn mounted on said support adjacent the concavity of said mandrel, means for fastening said circular horn eccentrically of said mandrel, said mandrel having a dovetailed slot in its convex face, a second crescent shaped mandrel having a key adapted to slide in the dovetailed slot of said first mandrel, whereby said mandrels are detachably connected to permit interchange of mandrels, said mandrels and horn being constructed and arranged to receive a container thereover, whereby on eccentric movement of the horn relative to said mandrels the side seam of said container will be ruptured.

8. In a device of the character described, the combination of a plurality of cooperative wall rupturing members adapted to have a seamed article positioned thereon, and means for shifting said members relatively to increase their distance apart whereby to supture the seam of the article.

9. In a device of the character described, the combination of a standard, a mandrel and a horn mounted thereon and having surfaces adapted to have a seamed article placed thereon, and means for shifting the horn and mandrel relatively to increase their distance apart so as to rupture the seam of the article.

10. In a device of the character described, the combination of a support, a mandrel thereon, said mandrel having supporting surfaces of a shape and cross section adapted to substantially fill and snugly receive thereover, a seamed container or other article, and means for increasing the cross sectional size of said container whereby to burst the seam of said container or article.

11. In a device of the character described, the combination of a support, a mandrel thereon, an interchangeable member detachably mounted on said mandrel, said member and mandrel when assembled being constructed and arranged to snugly receive thereover a seamed container or hollow body, and means for increasing the cross sectional size of said container for bursting the seam of said container or hollow body.

JOHN M. YOUNG.